US012391614B2

United States Patent
Takeda (10) Patent No.: US 12,391,614 B2
(45) Date of Patent: Aug. 19, 2025

(54) METHOD OF PRESSURE-PUMPING READY-MIXED CONCRETE

(71) Applicant: TAKE CITE CO., LTD., Shizuoka (JP)

(72) Inventor: Masanari Takeda, Shizuoka (JP)

(73) Assignee: TAKE CITE CO., LTD., Shizuoka (JP)

( * ) Notice: Subject to any disclaimer, the term of this patent is extended or adjusted under 35 U.S.C. 154(b) by 0 days.

(21) Appl. No.: 18/627,000

(22) Filed: Apr. 4, 2024

(65) Prior Publication Data
US 2024/0270639 A1 Aug. 15, 2024

Related U.S. Application Data

(63) Continuation of application No. 16/962,321, filed as application No. PCT/JP2019/000615 on Jan. 11, 2019, now abandoned.

(30) Foreign Application Priority Data

Jan. 16, 2018 (JP) .................. 2018-004657

(51) Int. Cl.
*C04B 14/28* (2006.01)
*B28C 7/16* (2006.01)
(Continued)

(52) U.S. Cl.
CPC ............. *C04B 14/28* (2013.01); *B28C 7/16* (2013.01); *C04B 16/02* (2013.01); *C04B 18/243* (2013.01);
(Continued)

(58) Field of Classification Search
CPC ....... C04B 14/28; C04B 16/02; C04B 18/243; C04B 14/26; C04B 2111/00344;
(Continued)

(56) References Cited

U.S. PATENT DOCUMENTS

2013/0225732 A1* 8/2013 Bakeev ................. C09J 101/04
 524/44
2017/0226407 A1 8/2017 Homma et al.

FOREIGN PATENT DOCUMENTS

EP 2236545 B1 8/2014
JP H06-207158 A 7/1994
(Continued)

OTHER PUBLICATIONS

International Search Report for PCT Application No. PCT/JP2019/000615, mailed Feb. 12, 2019, 4 pp.

*Primary Examiner* — Abbas Rashid
*Assistant Examiner* — Matthew M Eslami
(74) *Attorney, Agent, or Firm* — HAUPTMAN HAM, LLP (57) ABSTRACT

A method of pressure-pumping a ready-mixed concrete includes pouring a preceding material for pumping into a piping, then, pouring the ready-mixed concrete into the piping, and pressure-pumping the preceding material and the ready-mixed concrete, so that a lubricant layer formed of the preceding material is formed on an inner surface of the piping to thereby pressure-pump the ready-mixed concrete inside the lubricant layer made of the preceding material. The preceding material includes calcium carbonate as a main material, to which cellulose nanofibers and erythorobic acid are added, and an amount of the cellulose nanofibers is 0.005 wt % or more.

13 Claims, 7 Drawing Sheets

(51) Int. Cl.
*C04B 14/26* (2006.01)
*C04B 16/02* (2006.01)
*C04B 18/24* (2006.01)
*C04B 111/00* (2006.01)
*E04G 21/04* (2006.01)

(52) U.S. Cl.
CPC ............. *E04G 21/04* (2013.01); *C04B 14/26* (2013.01); *C04B 2111/00344* (2013.01)

(58) Field of Classification Search
CPC ........... C04B 2111/00146; C04B 18/16; C04B 18/24; C04B 30/00; B28C 7/16; E04G 21/04; Y02W 30/91
See application file for complete search history.

(56) References Cited

FOREIGN PATENT DOCUMENTS

| | | | |
|---|---|---|---|
| JP | 2513577 B2 * | 7/1996 | ............. C04B 14/28 |
| JP | H11-010630 A | 1/1999 | |
| JP | 2000034461 A | 2/2000 | |
| JP | 2002318078 A | 10/2002 | |
| JP | 2012096530 A | 5/2012 | |
| JP | 2015093473 A | 5/2015 | |
| JP | 2016074196 A | 5/2016 | |
| JP | 2017025235 A | 2/2017 | |
| WO | 2016060120 A1 | 4/2016 | |

\* cited by examiner

METHOD OF PRESSURE-PUMPING READY-MIXED CONCRETE

CROSS-REFERENCE TO RELATED APPLICATION

This is a continuation application of Ser. No. 16/962,321 filed on Jul. 15, 2020, which is National Phase of International Application No. PCT/JP2019/000615 filed Jan. 11, 2019, and claims priority from Japanese Application No. 2018-004657, filed Jan. 16, 2018, the disclosure of which is hereby incorporated by reference herein in its entirety.

TECHNICAL FIELD

The present invention relates to a method of pressure-pumping a ready-mixed concrete, which is used, for example, a ready-mixed concrete pumping vehicle. More particularly, the present invention discloses a preceding material for pumping, in which the pumping distance can be extended by using cellulose nanofiber (CNF).

BACKGROUND ART

Ready-mixed concrete pumping vehicles are used at various construction sites, as a means for pumping and casting of ready-mixed concrete into a predetermined place. The ready-mixed concrete pumping vehicle is provided with a hopper, a pump and a boom, and a piping is connected to an outlet of the pump. The piping is laid along the boom, and elongating toward a predetermined place into which the ready-mixed concrete is pumped. A ready-mixed concrete mixer vehicle feeds the ready-mixed concrete into the hopper, and the ready-mixed concrete is pumped to and casted in the predetermined place by the pump and piping.

When pumping of the ready-mixed concrete, if the ready-mixed concrete is poured directly into the piping, the water content in the ready-mixed concrete is taken away to the piping, and as a result, a coarse aggregate in the ready-mixed concrete tends to proceed first. This situation has a risk of clogging at a delivery end of pumping, due to intertangling of the coarse aggregate.

Accordingly, in conventional arts, before starting of pumping of the ready-mixed concrete, a preceding material for pumping is filled into the hopper, so that the preceding material for pumping may be poured into the piping in advance of the ready-mixed concrete. The preceding material for pumping in such a case is a cement paste, which is a mixture of water and cement.

However, when the cement paste is used as the preceding material for pumping, a large volume (for example, about 0.5 m$^3$) of cement paste is required, and furthermore, there is also a problem of inevitable and complicated work of mixing of water and cement.

Moreover, when the cement paste is used as the preceding material for pumping, there is also a problem that the preceding material may be mixed with the ready-mixed concrete, which causes deterioration of compressive strength after curing of the ready-mixed concrete.

In addition, there is also a problem that the large volume of cement paste, which has been used as the preceding material for pumping, will directly become the industrial waste.

For the purpose of solving of the above problem, some fresh types of preceding materials for pumping have been proposed, for example, as disclosed in Patent Document 1 and Patent Document 2. Each of these preceding materials for pumping is a water-absorbing resin, such as a crosslinked composition of polyacrylic acid, a crosslinked composition of polyacrylate, a crosslinked composition of acrylic acid—vinyl alcohol copolymer, a crosslinked composition of acrylate—vinyl alcohol copolymer, a crosslinked composition of starch—acrylic acid graft copolymer, a crosslinked composition of starch—acrylate graft copolymer, a crosslinked composition of isobutylene-maleic acid copolymer, a crosslinked composition of isobutylene—maleate copolymer, a crosslinked composition of styrene—maleic anhydride copolymer, a crosslinked composition of saponified vinyl ester—ethylenic unsaturated carboxylic copolymer, a crosslinked composition of saponified vinyl ester-ethylenic unsaturated carboxylic derivative copolymer, a crosslinked composition of polyethylene oxide, a crosslinked composition of ethylene oxide—propylene oxide copolymer, water-absorbing urethane, etc.

REFERENCE DOCUMENTS OF CONVENTIONAL ART

Patent Document(s)

Patent Document 1: Official Gazette, J P 2000-34461 A.
Patent Document 2: Official Gazette, J P 2016-74196 A.

SUMMARY OF THE INVENTION

Problems to be Solved by Invention

However, the above structures of the conventional arts have the following problems:

Namely, likewise the case of the inventions as disclosed in Patent Document 1 and Patent Document 2, where the water-absorbing resin is used instead of the cement paste, then, the problems with the use of the cement paste, i.e. the problem of requiring a large volume of cement paste and the problem of inevitable and complicated work, may be solved. However, the effect of such a solution is limited, and in the case of pumping for the longer distance, or in the case of pumping through the piping of which inner surface is somewhat rough, there is still a risk of clogging of the piping.

In the light of the above problems, it is an object of the present invention to provide a preceding material for pumping, which can extend the pumping distance with the very small amount of feeding thereof.

Means to Solve the Problem

To achieve the objects mentioned above, according to claim 1 of the present invention, a method of pressure-pumping a ready-mixed concrete, comprises pouring a preceding material for pumping into a piping, then, pouring the ready-mixed concrete into the piping, and pressure-pumping the preceding material and the ready-mixed concrete, so that a lubricant layer formed of the preceding material is formed on an inner surface of the piping to thereby pressure-pump the ready-mixed concrete inside the lubricant layer made of the preceding material. The preceding material comprises calcium carbonate as a main material, to which cellulose nanofibers and erythorobic acid are added, and wherein an amount of the cellulose nanofibers is 0.005 wt % or more.

Effect of the Invention

As described above, according to claim 1 of the present invention, the preceding material for pumping is formed in the piping, Therefore, a thin lubricant layer of a uniform thickness is formed inside the piping for a long distance, whereby the pumping distance is extended.

According to the present invention, with regard to the preceding material for pumping, erythorobic acid is added to the preceding material for pumping. Therefore, even in the unexpected case that the preceding material for pumping is mixed with the ready-mixed concrete to be casted, the compressive strength of concrete, after being casted and cured, may not be deteriorated.

MODE(S) FOR CARRYING OUT THE INVENTION

Figure 1:
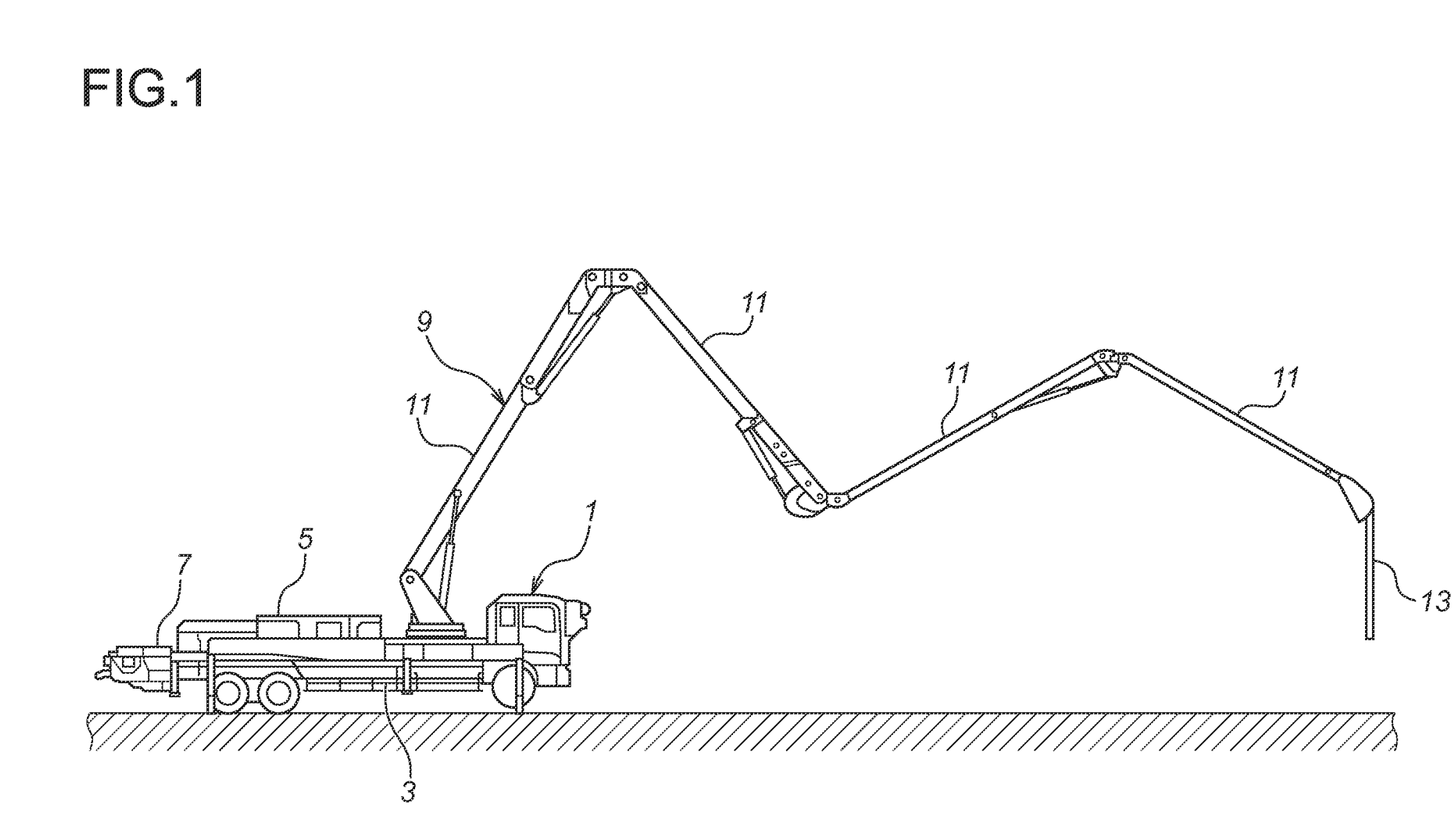
FIG. 1 is a side view showing a state that ready-mixed concrete is pumped and casted by a ready-mixed concrete pumping vehicle according to an embodiment of the present invention.

Now, an embodiment of the present invention will be explained with reference to FIG. 1 to FIGS. 8(a) and 8(b). FIG. 1 is a view showing a state that ready-mixed concrete is pumped to and casted in a destined place by a ready-mixed concrete pumping vehicle 1, wherein a squeeze-type pump 5 and a hopper 7 are installed on a vehicle main body 3 of the ready-mixed concrete pumping vehicle 1. Moreover, an extendible boom 9 is installed on the vehicle main body 3. The boom 9 comprises a plurality of arms 11, etc.

A piping 13 is connected to the pump 5, and the piping 13 comprises a plurality of steel pipes, of which head has a flexible synthetic rubber hose connected thereto, so as to be extended to a destined place along the boom 9.

For reference, depending on the type of site, the steel pipes may further be extended beyond the head of the boom 9, by connecting additional steel pipes.

Figure 2:
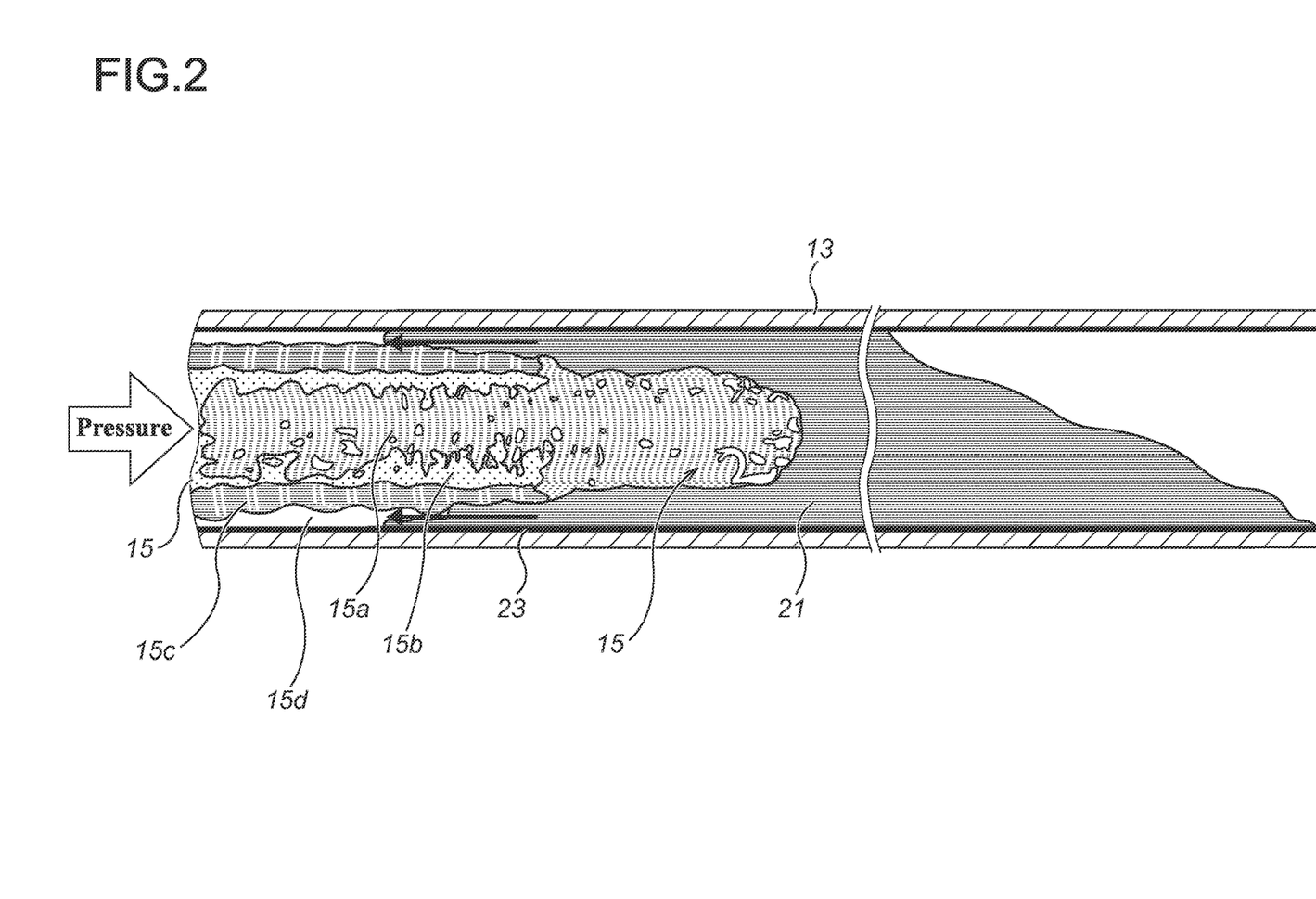
FIG. 2 is a sectional view schematically showing a state of a preceding material for pumping and ready-mixed concrete in a piping, according to the embodiment of the present invention.

Ready-mixed concrete 15 (as illustrated in FIG. 2) is fed into the hopper 7, from a ready-mixed concrete mixer vehicle (not shown). The ready-mixed concrete 15, which has been fed into the hopper 7, is pumped by the pump 5 and the piping 13 to the destined place, at which the casting is performed.

When pumping of the ready-mixed concrete 15, as illustrated in FIG. 15, a preceding material 21 for pumping is used. In this structure, the preceding material 21 for pumping is poured in advance of pouring of the ready-mixed concrete 15, so as to form a thin lubricant layer 23 of a uniform thickness on the inner peripheral surface of the piping 13. The ready-mixed concrete 15 is pumped via the inner side of the lubricant layer 23.

For reference, FIG. 2 is a sectional view schematically showing a state of the preceding material 21 for pumping and the ready-mixed concrete 15 in a piping 13.

The preceding material 21 for pumping includes cellulose nanofiber added thereto, and in the embodiment of the present invention, calcium carbonate ($CaCO_3$) is used as a main raw material, to which cellulose nanofiber is added, and furthermore, paper sludge, erythorobic acid ($C_6H_8O_6$), and/or fluorescent pigment as an example of color pigment, is also added. This structure will be explained in details hereinafter.

First, with regard to calcium carbonate, this is composed of porous calcium carbonate, hydrotalcite-containing porous calcium carbonate, and/or sedimentary calcium carbonate.

The porous calcium carbonate has been prepared, for example, by treatment of ready-mixed concrete sludge yielded in a ready-mixed concrete plant, with the particle size adjustment and the ingredient adjustment. The particle of the porous calcium carbonate has a lubrication effect (bearing effect) because of its round corners, and has an excellent water absorbing performance because of its porous structure, whereby contributing to the good fluidity of the preceding material 21 for pumping, in itself.

For reference, the ready-mixed concrete sludge means residue after collection of aggregate out of, for example, sludge water yielded from cleaning of ready-mixed concrete mixer vehicle or cleaning of agitator truck, or out of returned concrete or residual concrete.

The hydrotalcite-containing porous calcium carbonate has also been prepared, for example, by treatment of the ready-mixed concrete sludge yielded in the ready-mixed concrete plant, with the particle size adjustment and the ingredient adjustment, and is fine powder having a high fineness, composed solely of hydrotalcite and calcite. The hydrotalcite-containing porous calcium carbonate has the same effect as that of clay material, and takes on a role of viscosity adjustment as well as contributes to suppression of material separation, with regard to the preceding material 21 for pumping according to the present embodiment.

The hydrotalcite is a compound expressed as the general formula $[M^{2+}_{1-x}M3^{3+}_x(OH)_2][A^{n-}_{x/n} \cdot mH_2O]$. $M^{2+}$ is to express a metal ion of bivalence, $M3^{3+}$ is to express a metal ion of trivalence, and $A^{n-}_{x/n}$ is to express an interlamellar anion, respectively. Moreover, x is in the range of $0<x<1$, n is the valence of A, and m is in the range of $0 \leq m \leq 1$.

Figure 3:
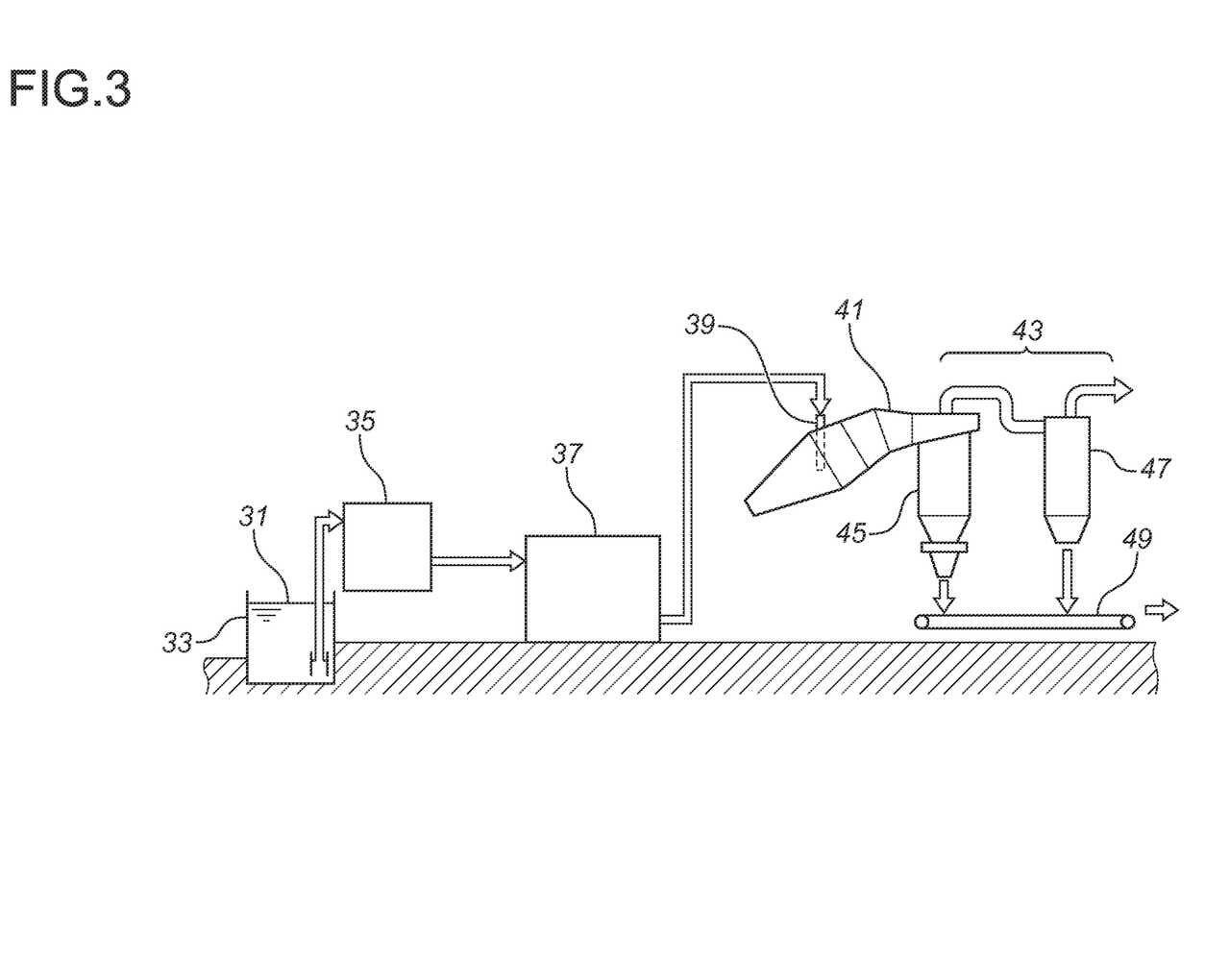
FIG. 3 is a systematic diagram showing a process of manufacturing calcium carbonate recovered from sludge of ready-mixed concrete, yielded in a ready-mixed concrete plant, according to the embodiment of the present invention.

The porous calcium carbonate and the hydrotalcite-containing porous calcium carbonate are produced, for example, by "Collection Method and Apparatus of Usable Particulate from Waste" as disclosed in the Official Gazette of Japanese Patent No. 4501098. FIG. 3 is a systematic diagram showing structural outlines of a collecting apparatus of Japanese Patent No. 4501098. First, muddy waste 31, which has been yielded in a ready-mixed concrete plant, is introduced in a deposit device 33, so as to deposit ready-mixed concrete sludge. Next, the deposited ready-mixed concrete sludge is taken out, and is introduced in a dewatering device 35, so as to perform the dewatering process until reaching the water content of 60% or less. Next, the dewatered sludge is taken out, and is dried (by natural drying or machine drying) until reaching the water content of 25% or less, and next, is introduced in a grinder 37, so as to be ground until reaching the particle size of 30 mm or less.

Next, the dried and ground sludge is fed into a cyclone classifier 41 by dried sludge feeding device 39, so as to be finely ground until reaching the particle size of 250 μm or the specific surface area of 4000 cm$^2$/g or finer (by Blaine air permeability measurement). Furthermore, the obtained finely ground particle is caught by a catching device 43. The catching device 43 is provided with two-staged bag filters 45, 47, in which, the first bag filter 45 catches the porous calcium carbonate, and the second bag filter 47 catches the hydrotalcite-containing porous calcium carbonate. These porous calcium carbonate and the hydrotalcite-containing porous calcium carbonate are dropped and caught onto a belt conveyor 49.

The sedimentary calcium carbonate is a synthetic calcium carbonate, and is fine powder calcium carbonate having a uniform particle shape by chemical treatment. Because of the uniform particle shape of the sedimentary calcium carbonate, when the preceding material 21 for pumping forms the lubricant layer 23, the surface of the lubricant layer 23 becomes uniform and smooth.

The cellulose nanofiber is fiber made of cellulose, and is a material of which fiber width has been refined to a nano-order level, that is a few hundredth or less of 1 μm, and in general, can be obtained from wood in abundance. The cellulose nanofiber has the characteristics of light-weight, strong, ultrafine fiber, large specific surface area, small dimensional change due to heat, excellent gas barrier property, exhibiting specific viscosity in the water, and environment-friendly.

The cellulose nanofiber spreads in a matrix state in the preceding material 21 for pumping, and consequently, the sedimentation of fine particle, of which specific weight is larger than the water, is prevented, and in addition, a thixotropic property (a property in which, the viscosity of fluid becomes smaller upon application of a specific pressure thereto, and after passing of a specific time, the viscosity returns to the original state) is imparted to the preceding material 21 for pumping. Accordingly, it is possible to prevent the preceding material 21 for pumping from being aggregated in the piping 13, and furthermore, because of having the fluidity upon application of force thereto, it is possible to adapt to the change of delivery velocity. Moreover, if solidified cement paste, etc., is remaining in the piping 13 due to insufficient cleaning, there is a risk of clogging of the piping, because the large volume of water content in the preceding material 21 for pumping will be taken out to the solidified cement paste. However, in the case of the preceding material 21 for pumping according to the present embodiment, with the addition of the cellulose nanofiber, there is no risk of excessive sticking, etc., to the inner peripheral surface of the piping 13, of the preceding material 21 for pumping, and it is possible to prevent the clogging of the piping.

The paper sludge as described above is, in particular, micro-sized cellulose fiber derived from paper sludge, and contributes, with regard to the preceding material 21 for pumping, to the material separation from the ready-mixed concrete 15.

The erythorobic acid as described above has the effect that, even where the preceding material 21 is mixed with the ready-mixed concrete, the deterioration of compressive strength of the ready-mixed concrete may be prevented.

The fluorescent pigment as described above is, in particular, a color pigment, and for example, a color pigment made by DayGlo Color Corp., USA. With the addition of such an organic fluorescent pigment to the preceding material 21 for pumping, it is possible to clearly distinguish the preceding material 21 for pumping, from the ready-mixed concrete 15.

With regard to the volume of each component of the preceding material 21 for pumping, according to an example 1 of the embodiment of the present invention, the porous calcium carbonate derived from the ready-mixed concrete sludge is 20 kg, the fine powder of the hydrotalcite-containing porous calcium carbonate derived from the ready-mixed concrete sludge is 2 kg, the sedimentary calcium carbonate is 12 kg, the paper sludge is 5 kg, the water is 25 liter, the cellulose nanofiber is 100 g, the erythorobic acid is 15 g, and the fluorescent pigment is 90 g. The above-described 100 g of cellulose nanofiber is composed of 5 g of cellulose nanofiber and 95 g of water. Therefore, as shown in the formula (1), in the case of the example 1, approximately 0.008 weight percent of the cellulose nanofiber is added thereto:

$$5 \text{ g}/64.205 \text{ kg} \approx 0.00008 \tag{1}$$

The preferable additional volume of the cellulose nanofiber is 0.005 weight percent or more.

In the case of the example 1, as the cellulose nanofiber, "BiNFi-s" (registered trademark) biomass nanofiber, made by Sugino Machine Limited, Japan, is used. This biomass nanofiber has been produced from cellulose, chitin, chitosan and carboxymethyl-cellulose (CMC) by ultrahigh pressure water-jet technology treatment. The cellulose nanofiber used in the example 1 is ultrafine fiber produced from cellulose by ultrahigh pressure water-jet technology treatment, of which diameter is 20 nm, and of which length is a few μm.

The function of the present embodiment will be explained on the basis of the above structure.

With reference to FIG. 1, first, the preceding material 21 for pumping according to the embodiment is filled in an outlet of the hopper 7, and subsequently, the ready-mixed concrete 15 is fed thereto. They are pumped to a destined place by the pump 5 and the piping 13.

For reference, where the pump 5 is not the squeeze type, but is the piston type, then, the preceding material 21 for pumping is filled in the inside of the piping of the pump 5 on the discharging side.

In the inside of the piping 13, it is assumed that the situation as illustrated in FIG. 2 is occurring. First, the preceding material 21 for pumping exists at the head of the inner space of the piping 13, and the thin lubricant layer 23 of a uniform thickness has been formed on the inner peripheral surface of the piping 13.

Meanwhile, with regard to the ready-mixed concrete 15, which is to be pumped subsequently to the preceding material 21 for pumping, the coarse aggregate, etc., having the large cubic volume and density, gathers to the center portion (shown by reference numeral 15*a* in FIG. 2), and the sand gathers to the outer periphery thereof (shown by reference numeral 15*b* in FIG. 2), and the cement gathers to the still outer periphery thereof (shown by reference numeral 15*c* in FIG. 2), and the water gathers to the still outer periphery thereof (shown by reference numeral 15*d* in FIG. 2). Moreover, the preceding material 21 for pumping intrudes into the top end portion of the ready-mixed concrete 15. In this state, the ready-mixed concrete 15 is pumped smoothly along the inner periphery of the lubricant layer 23 of the preceding material 21 for pumping.

It should be noted that FIG. 2 is the view merely showing the state schematically, and in the actual cases, it is assumed that the boundaries of these layers are intricating with each other.

After pumping through the piping 13, the ready-mixed concrete 15 is casted from the head of the piping 13, into e.g. a mold frame (not shown). At that time, first, the preceding material 21 for pumping, which has been pumped in advance, is disposed. Since the preceding material 21 for pumping has been colored by the organic fluorescent pigment, it is possible to confirm by visual recognition of the color of fluid discharged from the head of the piping 13. Then, after confirming that the preceding material 21 for pumping has been disposed completely, the ready-mixed concrete 15, pumped thereafter, is casted in the mold frame.

The state in the inside of the piping 13 will be explained more in details.

Since the preceding material 21 for pumping, to which the cellulose nanofiber has been added, has a specific thixotropic property, it is assumed that the following phenomenon is occurring among the preceding material 21 for pumping, the ready-mixed concrete 15 and the piping 13: that is, the relative velocity between the outermost periphery of the preceding material 21 for pumping and the inner peripheral surface of the piping 13 is large, and causing the large shearing force. Therefore, the outermost peripheral area of the preceding material 21 for pumping exhibits the excellent fluidity, and moistens the inner surface of the piping 13, which serves as the lubricant layer 23. On the other hand, the relative velocity in the inside of the preceding material 21 for pumping decreases gradually, from the outermost periphery toward the axis center, and the preceding material 21 for pumping proceeds in a state of gel-mass like solid bar. Strictly speaking, since the volume of the preceding material 21 for pumping is reduced in the course of moistening of the inner peripheral surface of the piping 13, with the further proceeding in the piping 13, the top end portion of the preceding material 21 for pumping goes forward in a shape that the solid bar is cut slantingly, namely, in a state that the contact line thereof with the inner peripheral surface of the piping 13 draws a parabola.

Meanwhile, the ready-mixed concrete 15 proceeds, in a state that the top end portion thereof pushes the rear end of the preceding material 21 for pumping, and the outermost periphery of the ready-mixed concrete 15 does not become in contact with the inner peripheral surface of the piping 13, but goes forward, in a state of being in contact with the lubricant layer 23 formed by the preceding material 21 for pumping. Therefore, the water content of the ready-mixed concrete 15 will not be taken out to the inner peripheral surface of the piping 13. Consequently, at the top end of the ready-mixed concrete 15, the advanced proceeding of the coarse aggregate is suppressed. Even in the case of advanced proceeding of the coarse aggregate, since the coarse aggregate intrudes into the solid-bar state of the preceding material 21 for pumping, the ready-mixed concrete 15 will not become in contact with the inner peripheral surface of the piping 13, and instead, the preceding material 21 for pumping is pressed against the inner peripheral surface of the piping 13, whereby the forming of the lubricant layer 23 is enhanced. Consequently, the pumping distance is extended.

With regard to the series of functions as described above, in the inside of the piping 13, the dynamic friction force of the preceding material 21 for pumping keeps a constant level, for example as compared with that of mortar, and therefore, the ready-mixed concrete 15 is pumped smoothly.

At the time of such a pumping, the paper sludge serves as a cushion.

Moreover, since the cellulose nanofiber imparts the thixotropic property to the preceding material 21 for pumping, the fluidity in a static state is suppressed, and consequently, for example, in the case of pumping in the downstream gradient, it is possible to prevent the advanced proceeding of the preceding material 21 for pumping.

Furthermore, with the cellulose nanofiber, it is possible to maintain the dispersibility of fine particle in the preceding material 21 for pumping.

Next, since various tests were performed for the purpose of confirming of the performance of the preceding material 21 for pumping according to the present embodiment, the results of these tests will be explained. First, a comparative test of dynamic friction force was performed, between a preceding material for pumping made of mortar, serving as a comparative example, and the preceding material 21 for pumping according to the example 1 of the present embodiment.

Figure 4:
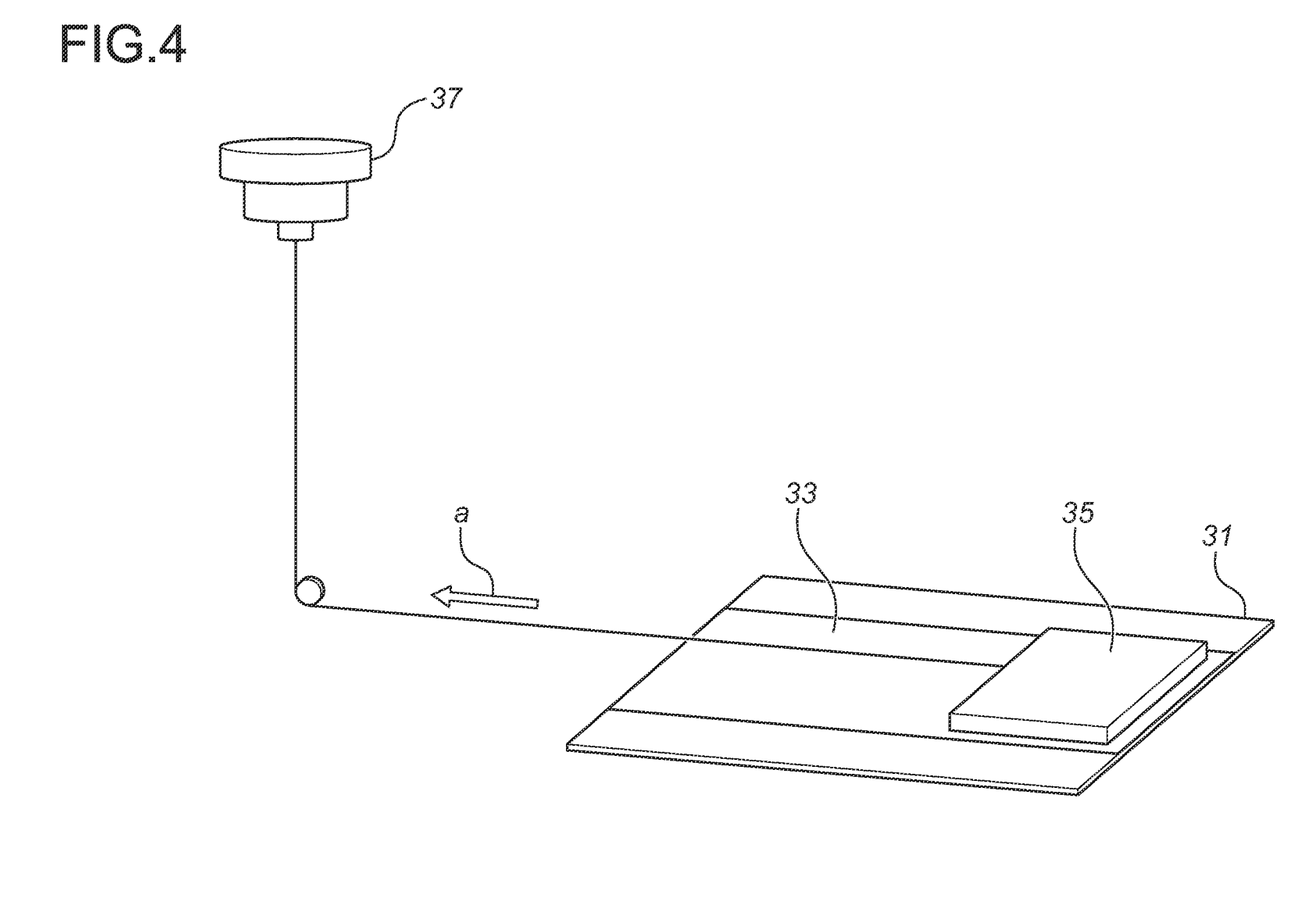
FIG. 4 is a view explaining a method of dynamic friction force comparative test according to the embodiment of the present invention.

First, the test method will be explained with reference to FIG. 4. A resin plate 31, of which thickness is 0.255 mm, was placed, and the paste of the mortar-made preceding material for pumping, serving as the comparative example, was coated on the resin plate 31, in the coating thickness of 0.230 mm. Thereafter, a sliding piece 35 was placed on such a coating film 33, and a load cell 37 was connected to the sliding piece 35 via a string body 36. Thus, the sliding piece 35 was slid, via the load cell 37 and the string body 36, in a direction as shown by an arrow a of FIG. 4, and the dynamic friction force at that time was measured by the load cell 37. The test velocity was 100 mm/min, and the load range was 2.5 N.

The same test was also performed by coating the preceding material 21 for pumping according to the example 1.

Figure 5:
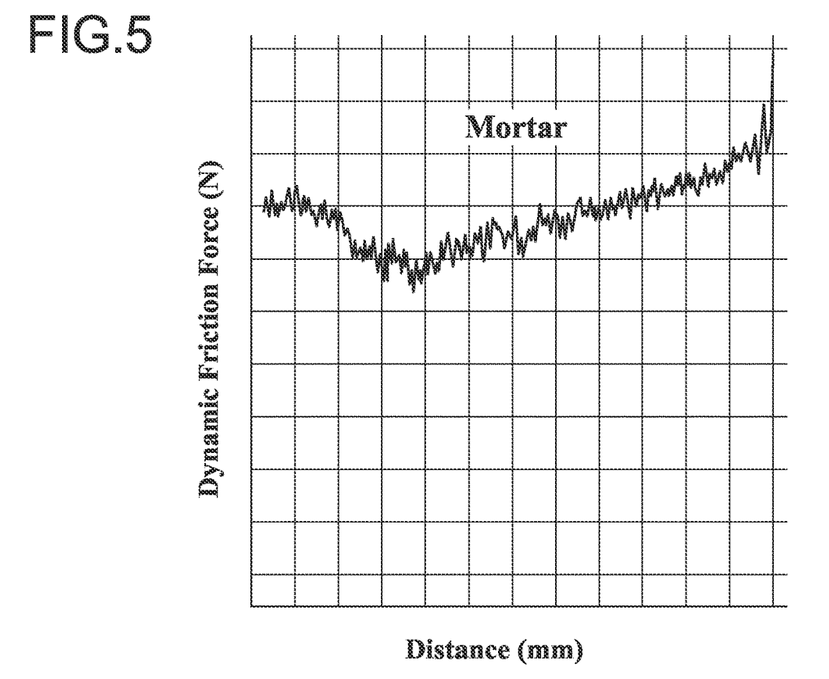
FIG. 5 is a graphic chart showing a result of dynamic friction force test of a preceding material made of mortar, according to the embodiment of the present invention.
Figure 6:
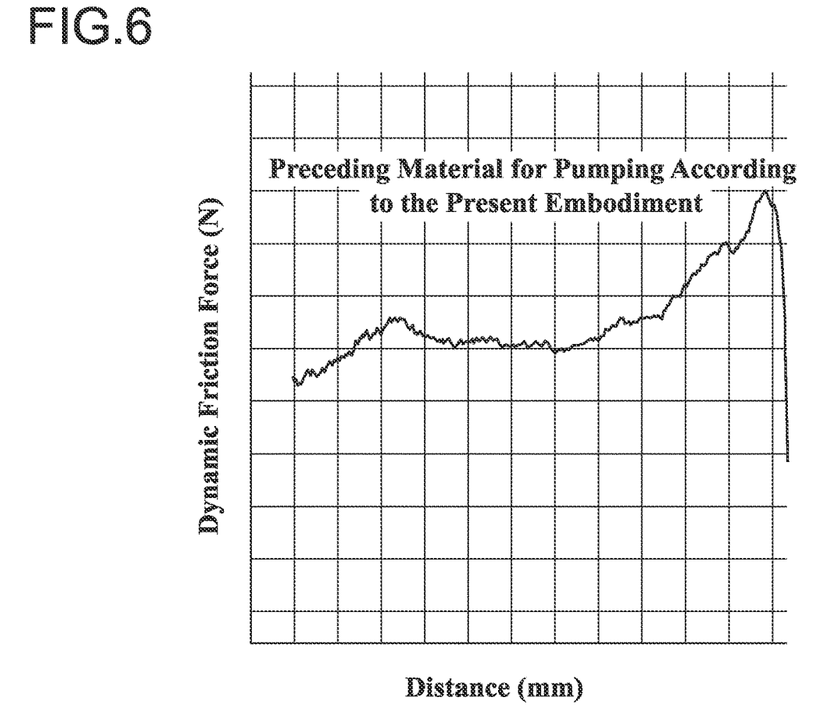
FIG. 6 is a graphic chart showing a result of dynamic friction force test of the preceding material for pumping according to the embodiment of the present invention.

The results are shown in FIG. 5 and FIG. 6. In FIG. 5, the horizontal axis shows the distance (mm) and the longitudinal axis shows the dynamic friction force (N), and the variation of dynamic friction force is shown with regard to the mortar-made preceding material for pumping, serving as the comparative example. In FIG. 6, the horizontal axis shows the distance (mm) and the longitudinal axis shows the dynamic friction force (N), and the variation of dynamic friction force is shown with regard to the preceding material 21 for pumping, according to the example 1. As is clear from FIG. 5 and FIG. 6, the dynamic friction force of the preceding material 21 for pumping, according to the example 1, is smaller than the dynamic friction force of the comparative example made of mortar.

Moreover, with regard to the mortar-made preceding material for pumping, serving as the comparative example, the waveform is waving largely, and on the other hand, with regard to the preceding material 21 for pumping, according to the example 1, the waveform is stable. Therefore, in the case of the preceding material 21 for pumping, according to the example 1, as compared with the mortar-made preceding material for pumping, serving as the comparative example, it is possible to maintain the constant dynamic friction force.

With the synergetic effect of these functions, the ready-mixed concrete 15 may be pumped smoothly for the long distance.

Figure 7A:
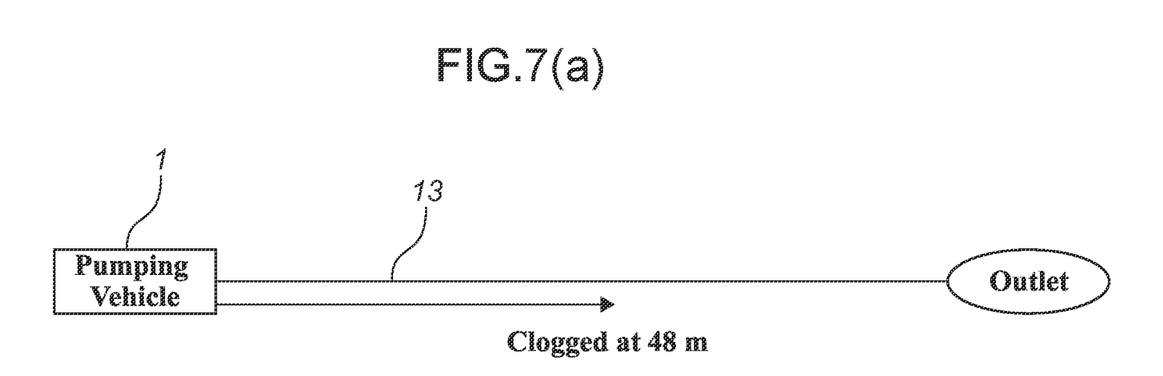
FIGS. 7(a) and 7(b) are views showing a method and results of ready-mixed concrete pumping distance comparative test according to the embodiment of the present invention, in which, FIG. 7 (a) is a view showing the ready-mixed concrete pumping distance where the preceding material for pumping made of mortar was used, and FIG. 7 (b) is a view showing the ready-mixed concrete pumping distance where the preceding material for pumping according to the embodiment of the present invention was used.
Figure 7B:
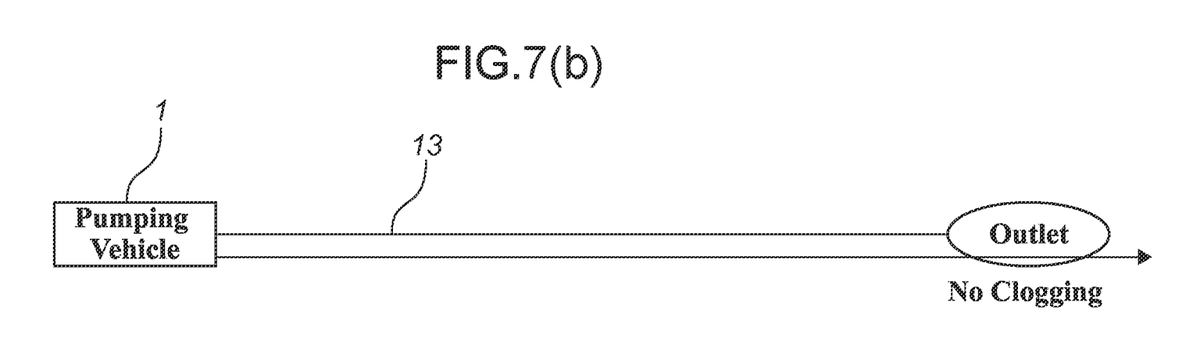

Next, a comparative test of pumping distance of ready-mixed concrete, will be explained with reference to FIGS. 7(*a*) and 7(*b*). As illustrated in FIGS. 7(*a*) and 7(*b*), two ready-mixed concrete pumping vehicles 1, 1 were provided, and the pipings 13, 13 were connected thereto, respectively, for the length of approximately 100 m. Thereafter, with regard to one ready-mixed concrete pumping vehicle 1, the mortar-made preceding material for pumping, serving as the comparative example, and the ready-mixed concrete, were pumped subsequently. Similarly, with regard to the other ready-mixed concrete pumping vehicle 1, the preceding material 21 for pumping, according to the example 1 of the present embodiment, and the ready-mixed concrete, were pumped subsequently. The volume of the preceding material for pumping as the comparative example, and the volume of the preceding material for pumping according to the example 1, were both 18 liter.

With regard to the piping 13, in particular, thirty-one steel pipes, each of which inner diameter was 107 mm and the length was 3 m, were connected to each other, and a flexible synthetic rubber hose, of which length was 7 m, was connected thereto.

Moreover, the pumping velocity was 10 m$^3$/h.

As a result, when the mortar-made preceding material for pumping, serving as the comparative example, was used, the clogging occurred around the point of 48 m. On the other hand, when the preceding material 21 for pumping, according to the example 1, was used, the pumping could be performed for the whole length of approximately 100 m. It is assumed that, this is because of the effective forming of the lubricant layer 23 on the inner peripheral surface of the piping 13, in the case of using of the preceding material 21 for pumping, according to the example 1.

For reference, the inner peripheral area of the piping 13 used for the test, was approximately 34.243 m$^2$, and it is assumed that the preceding material 21, of which volume was 18 liter, formed the lubricant layer 23 by spreading uniformly.

Figure 8A:
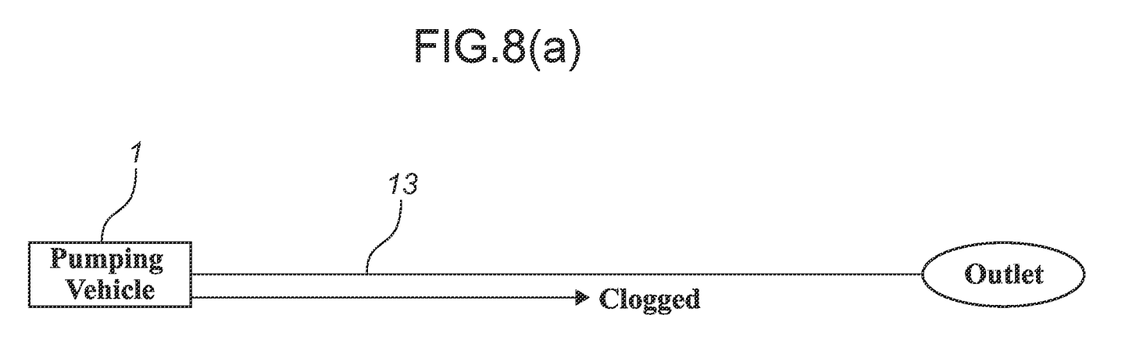
FIGS. 8(a) and 8(b) are views showing results of ready-mixed concrete pumping distance comparative test according to the embodiment of the present invention, in which, FIG. 8 (a) is a view showing the ready-mixed concrete pumping distance where the preceding material for pumping was used, in which cellulose nanofiber is excluded from the preceding material for pumping according to the embodiment of the present invention, and FIG. 8 (b) is a view showing the ready-mixed concrete pumping distance where the preceding material for pumping according to the embodiment of the present invention was used.
Figure 8B:
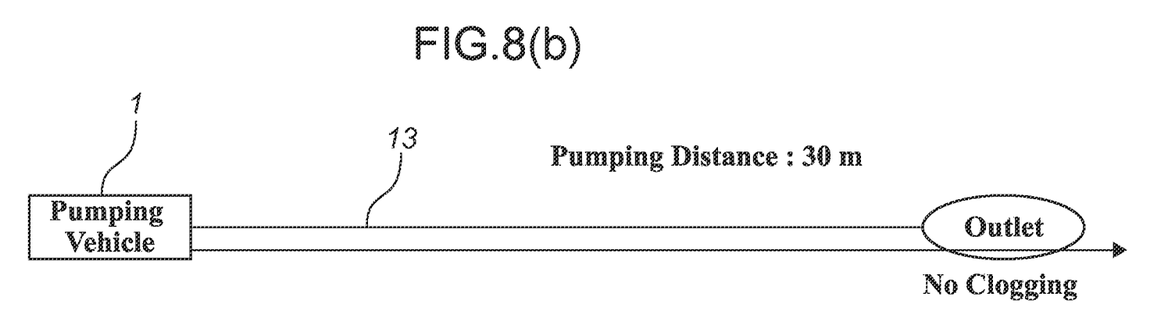

Next, a comparative test of pumping distance, depending on whether the cellulose nanofiber is provided or not, will be explained with reference to FIGS. 8(*a*) and 8(*b*). First, two types, namely, a cellulose nanofiber additive type, and a cellulose nanofiber non-additive type, were prepared. The additive type was the preceding material 21 for pumping according to the example 1 of the present embodiment, and the non-additive type was the preceding material 21 for pumping according to the example 1, from which the cellulose nanofiber had been excluded.

Moreover, the ready-mixed concrete pumping vehicles 1, 1 were provided. Each of the ready-mixed concrete pumping vehicles 1, 1 is a piston-type vehicle, of which boom length was 30 m, and had been cleaned by air cleaning only.

The reason for using of the piping 13, which had been cleaned by air cleaning only, will be explained as follows. There are two types of cleaning, namely, the cleaning by using the water, and the cleaning by using the air. If the cleaning by using the water is selected, the cleanness in the inside of the piping 13 will be improved. However, there may be a situation that, because of difficulty in using the large volume of cleaning water, etc., the cleaning was settled by air cleaning only. In the case of air cleaning, there may be the case that the solidified cement paste, etc., is remaining in the piping. Accordingly, in order to confirm that a desired pumping performance can be obtained in such a poor condition, in the present comparative test of pumping distance, the piping 13, which had been cleaned by air cleaning only, was used purposely.

With regard to one ready-mixed concrete pumping vehicle 1, the cellulose nanofiber non-additive type of preceding material for pumping, and the ready-mixed concrete 15, were pumped subsequently. Similarly, with regard to the other ready-mixed concrete pumping vehicle 1, the preceding material for pumping according to the example 1, and the ready-mixed concrete 15, were pumped subsequently.

As a result, when the cellulose nanofiber non-additive type of preceding material for pumping was used, the clogging occurred at the intermediate point (around the point of 15 m). On the other hand, when the preceding material 21 for pumping, according to the example 1, was used, the delivery could be performed without clogging.

The present embodiment has the following effects.

First, with the addition of the cellulose nanofiber to the preceding material 21 for pumping, even in the case that the inner surface of the piping 13 is somewhat rough because of the solidified cement paste, etc., remaining in the piping 13, the thin lubricant layer 23 of a uniform thickness may be formed in the inside of the piping 13, whereby the pumping distance of the ready-mixed concrete 15 may be extended.

In particular, in the case of the present embodiment, since the cellulose nanofiber is added for 0.008 weight percent or more, the above effect may be obtained securely.

Moreover, since the paper sludge is added to the preceding material 21 for pumping, it is possible to effectively separate the preceding material 21 for pumping, from the ready-mixed concrete 15 to be pumped.

Moreover, since the erythorobic acid is added to the preceding material 21 for pumping, even in the unexpected case that the preceding material 21 for pumping is mixed with the ready-mixed concrete 15 to be casted, the compressive strength of concrete, after being casted and cured, may not be deteriorated.

Moreover, since the calcium carbonate recovered from the sludge is contained in the calcium carbonate, it is possible to utilize the concrete sludge effectively.

Moreover, since the porous calcium carbonate in the calcium carbonate recovered from the sludge has the round corners, it is possible to obtain the bearing effect, and because of its porous structure, the excellent water absorbing performance may be exhibited, whereby contributing to the good fluidity of the preceding material 21 for pumping, in itself.

Moreover, the hydrotalcite-containing porous calcium carbonate, contained in the calcium carbonate recovered from the sludge, has the excellent powder fineness, and contains the hydrotalcite. These characteristics contribute to the viscosity adjustment of the preceding material 21 for pumping, and also contributes to the suppression of material separation.

Moreover, the sedimentary calcium carbonate contained in the calcium carbonate contributes to the forming of the uniform and smooth surface of the lubricant layer 23.

And moreover, since the organic fluorescent pigment is added, it is possible to clearly distinguish the preceding material 21 for pumping, from the ready-mixed concrete 15.

Accordingly, it is possible to prevent the preceding material 21 for pumping, from being mixed with the ready-mixed concrete 15 to be casted.

The present invention is not limited to the embodiment as described above.

First, in the embodiment as described above, with regard to the volume of each component comprising the preceding material for pumping, an example is shown as the example 1. However, the present invention is not limited to such an example, and it is needless to say that the added volume of the cellulose nanofiber is not limited to such an example, either. Moreover, with regard to the manufacturing method thereof, other than the aqueous counter collision method of "BiNFi-s" (registered trademark), various types of cellulose nanofiber may be used, which has been manufactured by physical treatment such as the grinding method or the ball milling method, or by chemical treatment such as the catalytic oxidation method with regard to TEMPO (2,2,6,6-tetramethylpiperidine 1-oxyl).

Moreover, in the embodiment as described above, a part of the calcium carbonate is the calcium carbonate recovered from the sludge. However, the present invention is not limited to such an example, and it is also possible to use the calcium carbonate recovered from the sludge, as the whole component. It is needless to say that there may be a structure in which the calcium carbonate recovered from the sludge is not used at all.

Moreover, in the embodiment as described above, the calcium carbonate recovered from the sludge is obtained by treatment of the muddy waste in the ready-mixed concrete plant. However, the present invention is not limited to such an example, and it is also possible to use any other type of muddy waste.

Moreover, in the embodiment as described above, the explanation was made with regard to the pumping of the ready-mixed concrete as an example. However, the present invention is not limited to such an example, and it is also possible to adopt the present invention to the pumping of other types of paste-state fluid, mixed with mass objects and having a risk of clogging, for example, the pumping of the mass of coal and fine powder of coal dispersing in the water.

INDUSTRIAL APPLICABILITY

The present invention relates to the preceding material for pumping, which is used during pumping and casting of the ready-mixed concrete by using, for example, the ready-mixed concrete pumping vehicle. More particularly, the present invention relates to the preceding material for pumping, in which the pumping distance can be extended by using cellulose nanofiber. The present invention is suitable, for example, for casting of the ready-mixed concrete at various construction sites.

EXPLANATION OF REFERENCE NUMERALS AND SIGNS

1 Ready-mixed Concrete Pumping Vehicle
3 Vehicle Main Body
5 Pump
7 Hopper
9 Boom
11 Arm
13 Piping
15 Ready-mixed Concrete
21 Preceding Material
23 Lubricant Layer

What is claimed is:

1. A method of pressure-pumping a ready-mixed concrete, comprising:
   pouring a preceding material for pumping into an outlet of a hopper connected to a pump,
   subsequently, pouring the ready-mixed concrete into the outlet of the hopper over the preceding material,
   pressure-pumping the preceding material and the ready-mixed concrete together towards a piping connected to an outlet of the pump, so that a lubricant layer comprising the preceding material is formed on an inner surface of a piping,
   pressure-pumping a top end portion of the ready-mixed concrete so as to push a rear end of the preceding material inside the piping,
   wherein the preceding material comprises calcium carbonate, cellulose nanofibers and erythorobic acid,
   wherein the calcium carbonate comprises porous calcium carbonate, hydrotalcite-containing porous calcium carbonate, and sedimentary calcium carbonate,
   wherein the porous calcium carbonate and the hydrotalcite-containing porous calcium carbonate are processed by treating the ready-mixed concrete sludge yielded in a ready-mixed concrete plant, for a particle size adjustment and an ingredient adjustment, and the sedimentary calcium carbonate has a uniform particle shape by chemical treatment, and
   wherein an amount of the cellulose nanofibers is 0.005 wt % to 0.008 wt %.

2. The method according to claim 1, wherein the calcium carbonate comprises wholly or partly a calcium carbonate derived from a recycled ready-mixed concrete sludge.

3. The method according to claim 1, wherein the preceding material further comprises a paper sludge.

4. The method according to claim 1, wherein the preceding material further comprises a color pigment.

5. The method according to claim 3, wherein the paper sludge is a cellulose fiber.

6. The method according to claim 1, wherein an amount of erythorobic acid is 0.02 wt % or more.

7. A method of pressure-pumping a ready-mixed concrete, comprising:
   preparing a preceding material by mixing calcium carbonate, cellulose nanofiber, and erythorobic acid,
   pouring the preceding material for pumping into an outlet of a hopper connected to a pump,
   subsequently, pouring the ready-mixed concrete into the outlet of the hopper over the preceding material,
   pressure-pumping the preceding material and the ready-mixed concrete together towards a piping connected to an outlet of the pump, so that a lubricant layer comprising the preceding material is formed on an inner surface of the piping,
   pressure-pumping a top end portion of the ready-mixed concrete so as to push a rear end of the preceding material inside the piping,
   wherein the preceding material comprises calcium carbonate, cellulose nanofibers and erythorobic acid,
   wherein the calcium carbonate comprises porous calcium carbonate, hydrotalcite-containing porous calcium carbonate, and sedimentary calcium carbonate,
   wherein the porous calcium carbonate and the hydrotalcite-containing porous calcium carbonate are processed by treating the ready-mixed concrete sludge yielded in a ready-mixed concrete plant, for a particle size adjustment and an ingredient adjustment, and the sedimentary calcium carbonate has a uniform particle shape by chemical treatment, and wherein an amount of the cellulose nanofibers is 0.005 wt % to 0.008 wt %.

8. A method of pressure-pumping a ready-mixed concrete, comprising:

pouring a preceding material for pumping into a discharge side of a pump, subsequently, pouring the ready-mixed concrete into a hopper connected to the pump over the preceding material, pressure-pumping the preceding material and the ready-mixed concrete together towards a piping connected to an outlet of the pump, so that a lubricant layer comprising the preceding material is formed on an inner surface of the piping, pressure-pumping a top end portion of the ready-mixed concrete so as to push a rear end of the preceding material inside the piping, wherein the preceding material comprises calcium carbonate, cellulose nanofibers and erythorobic acid, wherein the calcium carbonate comprises porous calcium carbonate, hydrotalcite-containing porous calcium carbonate, and sedimentary calcium carbonate, wherein the porous calcium carbonate and the hydrotalcite-containing porous calcium carbonate are processed by treating the ready-mixed concrete sludge yielded in a ready-mixed concrete plant, for a particle size adjustment and an ingredient adjustment, and the sedimentary calcium carbonate has a uniform particle shape by chemical treatment, and wherein an amount of the cellulose nanofibers is 0.005 wt % to 0.008 wt %.

9. The method according to claim 8, wherein the calcium carbonate comprises wholly or partly a calcium carbonate derived from a recycled ready-mixed concrete sludge.

10. The method according to claim 8, wherein the preceding material further comprises a paper sludge.

11. The method according to claim 8, wherein the preceding material further comprises a color pigment.

12. The method according to claim 10, wherein the paper sludge is a cellulose fiber.

13. The method according to claim 8, wherein an amount of erythorobic acid is 0.02 wt % or more.

\* \* \* \* \*